United States Patent
Patrice

(10) Patent No.: US 9,014,755 B2
(45) Date of Patent: Apr. 21, 2015

(54) RADIOFREQUENCY LOCAL COMMUNICATION INTERFACE BETWEEN A MOBILE PHONE AND A CONTACTLESS READER

(75) Inventor: Philippe Patrice, Marseille (FR)

(73) Assignee: Smart Packaging Solutions (SPS), Rousset (FR)

( * ) Notice: Subject to any disclaimer, the term of this patent is extended or adjusted under 35 U.S.C. 154(b) by 499 days.

(21) Appl. No.: 12/520,442

(22) PCT Filed: Dec. 20, 2007

(86) PCT No.: PCT/FR2007/002128
§ 371 (c)(1),
(2), (4) Date: Jun. 19, 2009

(87) PCT Pub. No.: WO2008/096058
PCT Pub. Date: Aug. 14, 2008

(65) Prior Publication Data
US 2010/0016020 A1    Jan. 21, 2010

(30) Foreign Application Priority Data
Dec. 20, 2006    (FR) ...................................... 06 11189

(51) Int. Cl.
*H04M 1/00* (2006.01)
*H04B 1/38* (2006.01)
*G06K 19/077* (2006.01)

(52) U.S. Cl.
CPC .... G06K 19/07749 (2013.01); G06K 19/07769 (2013.01)

(58) Field of Classification Search
CPC ........... H04B 1/3816; H04M 2250/14; H04W 88/02; H04W 8/183; H04W 12/06
USPC .................. 455/66.1, 550.1, 556.1, 557, 558, 455/562.1, 575.1
See application file for complete search history.

(56) References Cited

U.S. PATENT DOCUMENTS

| | | | | |
|---|---|---|---|---|
| 5,995,050 | A * | 11/1999 | Moller et al. .................. | 343/702 |
| 7,509,143 | B2 * | 3/2009 | Lintern et al. ................ | 455/558 |
| 8,644,880 | B2 * | 2/2014 | Patrice ....................... | 455/556.1 |
| 2001/0006902 | A1 | 7/2001 | Ito | |
| 2002/0021252 | A1 * | 2/2002 | Schremmer et al. .......... | 343/702 |
| 2003/0083041 | A1 * | 5/2003 | Kumar et al. ................. | 455/406 |
| 2004/0127256 | A1 * | 7/2004 | Goldthwaite et al. ........ | 455/558 |
| 2007/0213096 | A1 * | 9/2007 | Bella et al. ..................... | 455/558 |
| 2007/0267506 | A1 * | 11/2007 | Bashan et al. ................. | 235/492 |

(Continued)

FOREIGN PATENT DOCUMENTS

JP    2003-076971 A    3/2003

OTHER PUBLICATIONS

Form PCT/ISA/210 (International Search Report) dated Sep. 9, 2008.

*Primary Examiner* — Andrew Wendell
(74) *Attorney, Agent, or Firm* — Buchanan Ingersoll & Rooney PC

(57) ABSTRACT

A communication interface between a smart card to be connected to a smart card connector of a communication mobile substrate, and a wireless communication network, is disclosed. An antenna is offset and/or can be offset outside the structure of the communication mobile substrate, so that the smart card can communicate directly with a contactless communication network without using the communication mobile substrate.

12 Claims, 2 Drawing Sheets

(56) References Cited

U.S. PATENT DOCUMENTS

| | | | |
|---|---|---|---|
| 2009/0005117 A1* | 1/2009 | Bashan et al. | 455/558 |
| 2009/0143104 A1* | 6/2009 | Loh et al. | 455/558 |
| 2009/0239512 A1* | 9/2009 | Hammad et al. | 455/414.1 |
| 2010/0022273 A1* | 1/2010 | Patrice | 455/558 |

* cited by examiner

RADIOFREQUENCY LOCAL COMMUNICATION INTERFACE BETWEEN A MOBILE PHONE AND A CONTACTLESS READER

FIELD

The invention relates to a radiofrequency interface device for smart cards of the SIM type or any other form factor, more particularly intended to be used with a communication mobile substrate such as, more particularly a mobile phone, a personal digital assistant or similar, as well as a communication mobile substrate provided with such an interface device.

BACKGROUND

In the following part of the description of the present invention, a communication mobile substrate will be used as an example, in the form of a mobile telephone compatible with the GSM or equivalent networks, it being understood that the invention can also be applied to other communication substrates using radiofrequencies which are different from mobile telephones.

Mobile telephones have recently known a wide success on the international scale, so that billions of persons always have their mobile telephones with them. In this context, the mobile telephone seems to be more and more a hardware and software platform, whereon other applications than the mobile telephone application through the GSM network or an equivalent could be used.

Thus, the mobile telephone operators already provide all kinds of additional applications which are independent of the telephone application such as for example games, a digital camera, a file reader of the mp3 type and other entertainment applications. Some of the additional applications used today, such as the management of the organizer or the digital camera, use the memory of the smart card of the SIM type or the additional memory located in other formats of card intended for this purpose to store thereon the application data, which contributes to the fact that cards have always increasing memory capacities, of several hundreds of megabytes or even more. However, in the present application of the mobile telephones, the SIM card interacts with the mobile telephone using contacts positioned on the SIM card and the mobile telephone interacts with the cell telephone network, in particular under the GSM standard, using an antenna positioned on the mobile telephone.

However, considering the generalization of the mobile telephone as an application platform beyond the telephone applications, new needs have arisen since several applications which are hosted in the smart card of the SIM type or in cards of different formats, positioned in the mobile telephone such as, in a non limitative way, a "SD card", a "mini SD card", a Multi Media Card also called "MMC card", could take advantage of a direct radio communication with a contactless card reader positioned in the environment of the mobile telephone or, more generally, of the communication mobile substrate. The applications for the contactless payment smart cards or the applications for the physical access control using such smart cards used as identifiers, are examples of applications which could further enhance the range of services provided by a mobile telephone. In these new contactless applications which are proximity applications in so far as the card needs to interact through a contactless coupling with a card reader which is also operated without contact, it is necessary to set up a direct radio frequency communication between the smart card reader and the card which hosts the additional application such as the payment or any other one and all this without using the cell telephone network.

Now in the mobile telephones according to the present state of the art, the smart card is in general inserted into a recess provided with contacts, so that the contacts of the mobile telephone, which is operating as a smart card reader, come in contact with the contacts of said smart card. And the recess receiving the smart card is positioned inside the mobile telephone most often opposite the battery which is used as a back cover of the telephone, the front face of the latter being used for the screen and the keypad of the telephone. Thus, the battery of most mobile telephones on the field covers a large portion of the back face of the telephone all the more so since the increasing needs for self containment tend to demand high capacity batteries which thus have larger dimensions. In addition, the metallic structure of the battery mostly made of lithium does not make it possible for the radio frequency signals used to travel satisfactorily to a contactless reader positioned in the vicinity of the mobile telephone.

This last point is an important obstacle to the development of the applications of the contactless type using a mobile telephone, since the users' mobile telephones should be massively changed.

SUMMARY

The aim of the invention is thus to remedy this disadvantage and to provide a radiofrequency interface device making it possible to solve the problem of the battery which is an obstacle to direct radiofrequency communications between the smart card and the mobile telephone outside environment, more particularly proximity readers with a contactless operation.

Another aim of the invention is to provide a particularly simple and not expensive interface device making it possible to adapt to the fleet of already installed mobile telephones.

For this purpose, the aim of the invention is a radiofrequency interface device composed of a smart card intended to be connected to the mobile telephone card connector, and a terminal with a contactless operation, characterised in that it includes an antenna that is offset and/or can be offset outside the structure of the mobile telephone, so that the smart card can communicate directly with a wireless network without using the mobile telephone.

Advantageously, the interface includes a flexible circuitry connected on the one hand to the contacts of the smart card and on the other hand to the terminals of the offset antenna.

In a particular embodiment, the offset antenna can be positioned in a mechanical guide able to be moved in extension relative to the body of the mobile telephone, so that, when the mechanical guide is in extended (or spread) position, the offset antenna directly collects the radio waves intended for the smart card, without the body of the mobile telephone being an obstacle.

Preferably, the offset antenna is integral with the sliding mechanical guide intended to be spread beyond the body of the mobile telephone, during a contactless communication between the smart card and a contactless card reader.

According to another advantageous solution, the communication interface is positioned on the outer face of the cover of the mobile telephone battery, so that the antenna can directly collect the whole or a part of the magnetic flow from the contactless smart card reader without going through the body of the mobile telephone.

The invention also aims at a mobile telephone provided with a communication interface such as mentioned hereabove.

BRIEF DESCRIPTION OF THE DRAWING FIGURES

Other characteristics and advantages of the invention will appear upon reading the detailed description and referring to the appended drawings wherein:

FIG. 1 schematically illustrates in longitudinal cross-section a communication mobile substrate such as a mobile telephone, for example according to the state of the art;

DETAILED DESCRIPTION

Figure 1:
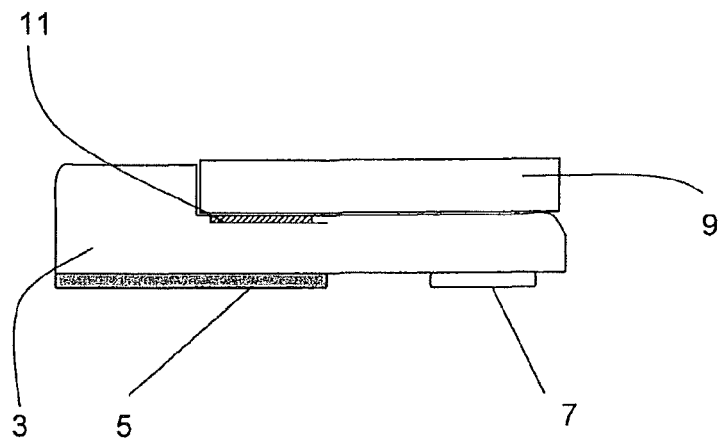

We are now referring to FIG. 1. In this Figure, a mobile telephone 1 provided with a body 3, a screen 5 and a keypad 7 positioned on the front face of the body 3, are shown in a longitudinal cross-section. The mobile telephone 1 further includes a battery 9 having the form of a cover and being positioned on the back face of the body 3. A SIM card 11 is shown in a schematic way and in cross-section. It is inserted between the battery 9 which supplies it, and which supplies the mobile telephone as a whole, and the front face 3 which carries the keypad 7 and the screen 5. Considering the relatively big size of the battery 9 and knowing that the battery is an obstacle to the propagation of radio waves, it is clear that an application of the payment type executed in a memory of the SIM card 11 or another memory positioned in the vicinity of the battery will not be able to have a contactless communication with a contactless reader located outside the mobile telephone.

In order to solve this problem, the applicant developed a very simple communication interface making it possible to link an application which is executed in a memory positioned under the cover supplied by the battery, for example the SIM card 11, and a contactless reader located at said mobile telephone 1 and not shown.

Figure 2:
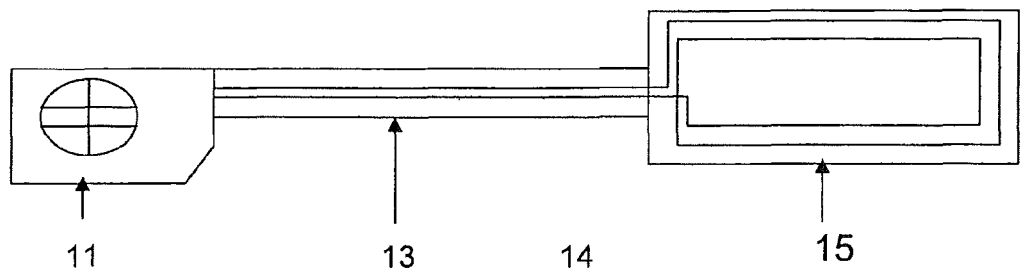
FIG. 2 illustrates a first embodiment of the communication interface according to the invention in a plane view.

A first embodiment of this interface 14 according to the invention is shown in FIG. 2. The principle resides in the connection of the SIM card 11 or similar through a network of wires 13 or other flexible electrical conductors to an antenna 15 which is able to be spread beyond the body 3 of the mobile telephone, so that the waves emitted by or intended to the antenna 15 can reach the latter therein without being blocked by the battery 9.

Figure 3:
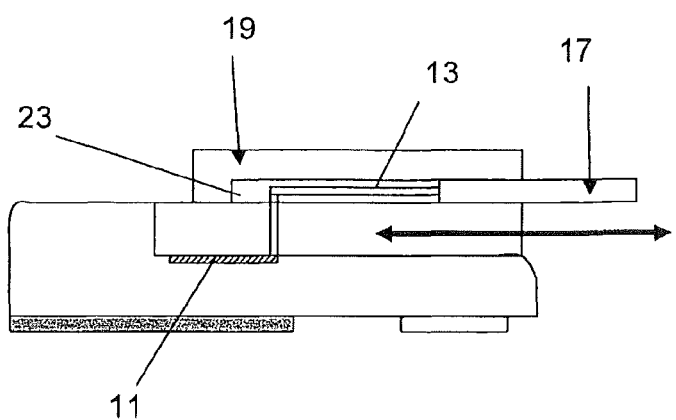
FIG. 3 illustrates the communication interface of FIG. 2, inserted in a mobile telephone in longitudinal cross-section.
Figure 4:
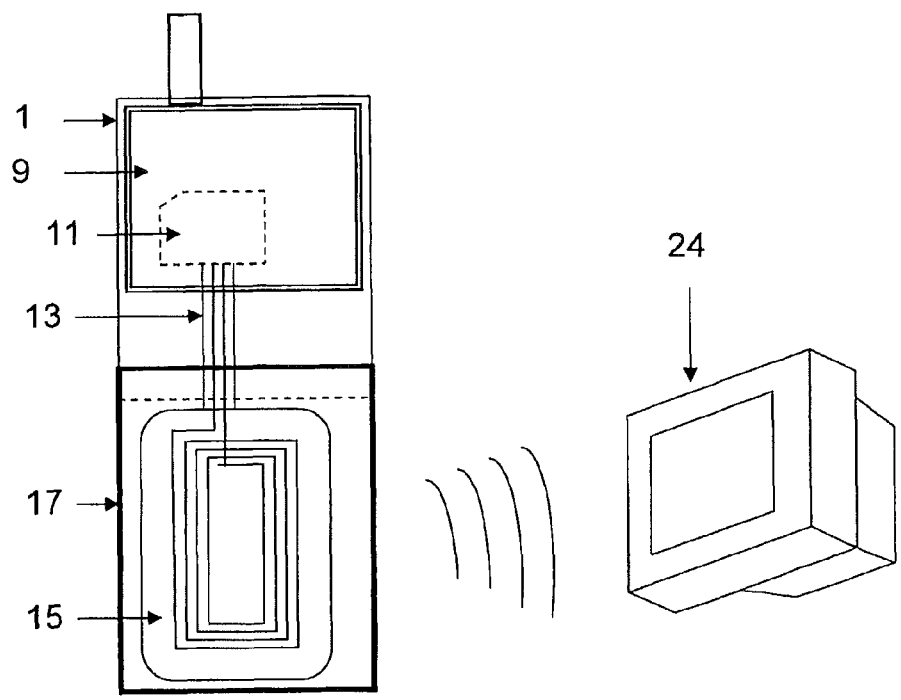
FIG. 4 illustrates the communication interface of FIG. 2, inserted in a mobile telephone in a plane view.

Now, reference is made to FIG. 3. To be able to handle the antenna 15 upon request when a wireless communication is necessary between the SIM card 11 or any other smart card, and an external contactless reader, the antenna 15 is fixed on a sliding substrate 17 for example a plane frame mounted to slide in a groove or an appropriate space 21 provided in the body of the mobile telephone. As shown in FIG. 3, the sliding substrate 17 is for example held by a cover 19 under which the substrate 17 carrying the antenna is able to slide. As can be seen in FIG. 3 and in FIG. 4 whereon the sliding substrate 17 is shown in a spread position beyond the end 21 of the body of the mobile telephone, the substrate 17 and consequently the antenna 15 it carries, overhangs relative to the body of the mobile telephone, thanks to the length of the conducting wires 13 provided for this purpose. When the antenna 15 is in this position, the radio waves which are sent or received by the antenna 15 can be exchanged with an external radio frequency device, such as a contactless smart card reader without being blocked by the electronic of the mobile telephone and more particularly by the battery 9 thereof.

When the transaction between the internal smart card 11 and the external contactless card reader is completed, the user can easily push the sliding substrate 17 carrying the antenna back into the recess 23 thereof.

Figure 5:
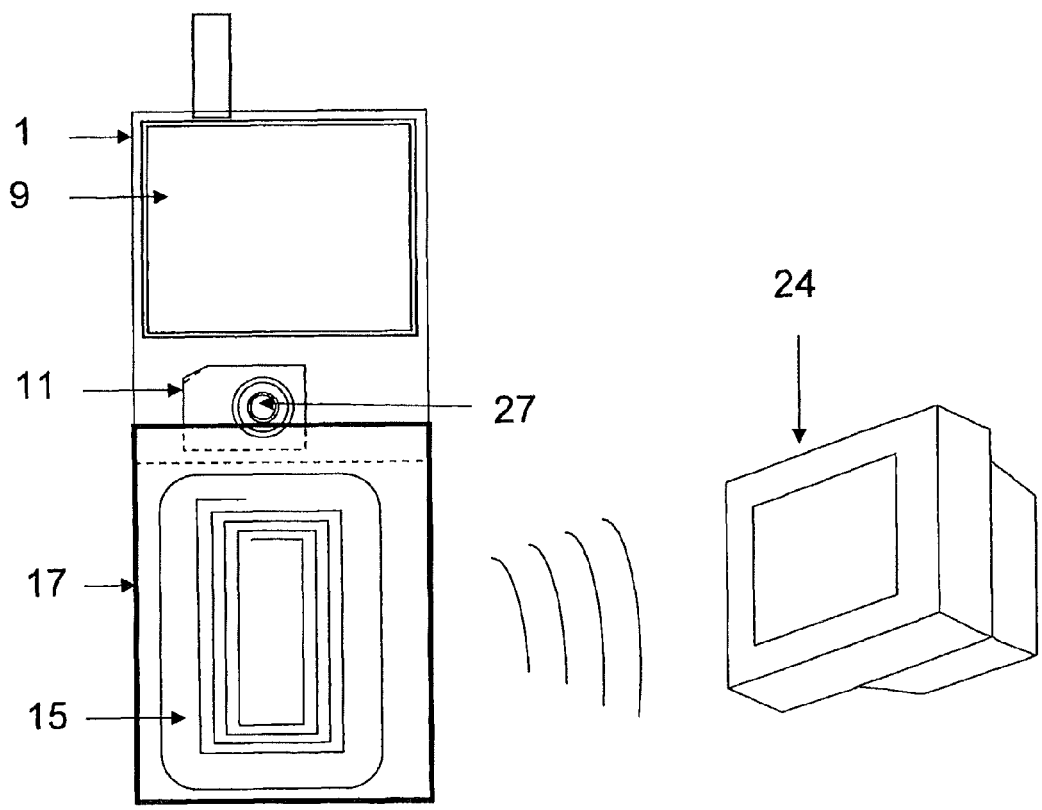
FIG. 5 illustrates another embodiment of the communication interface according to the invention, inserted in a mobile telephone in a plane view.

Now, reference is made to FIG. 5, wherein an even more advantageous embodiment of the invention is shown in plane. In this embodiment, the smart card or the SIM card 11 which includes an application which must communicate with a contactless reader 24 located outside is provided with a small size antenna 27, as this is the case for example of the so-called double interface smart cards or hybrid cards known in the state of the art. This smart card is ideally positioned in the mobile telephone, in a zone where it is not covered or not totally covered by the battery 9 so that the electromagnetic flux which surrounds the antenna 27 of the smart card also surrounds the antenna 15 of the interface in a spread position, thus creating a mutual inductance between the antenna 27 of the smart card 11 and the antenna 15. Thus, the connection conductive wires 13 described in the embodiment of FIGS. 2 to 4 can be omitted in this embodiment.

In operation, the spread antenna 15 according to the second embodiment makes it possible to transmit to the outside, to the external contactless reader 24, the radiofrequency signal emitted by the contactless smart card. This transmission is even made with amplification, in so far as the size of the antenna 15 is greater than the size of the antenna 27 of the contactless smart card, which has the advantageous effect of increasing the transmission range between the contactless smart card and the external reader.

The solution proposed makes it possible for all the existing mobile telephones to have access to this application.

The invention claimed is:

1. A communication interface between a smart card to be connected to a smart card connector of a communication mobile substrate and a contactless communication network, comprising an antenna that is positioned in a mechanical guide able to be moved in extension with respect to the body of the communication mobile substrate, so that, when the mechanical guide is in an extended position, the antenna directly collects the radiofrequency waves intended for the smart card without the body of the communication mobile substrate being an obstacle for the radiofrequency waves, so that the smart card can communicate directly with a contactless communication network without using the communication mobile substrate, wherein the antenna is inductively coupled to the smart card located in the communication mobile substrate.

2. A communication interface according to claim 1, comprising a flexible circuitry, electrically connecting on the one hand the smart card and on the other hand the channels of the offset antenna.

3. A communication interface according to claim 1, wherein the antenna that is offset and/or can be offset can be positioned on any one of the components of the communication mobile substrate.

4. A communication interface according to claim 1, wherein the offset antenna is integral with a sliding mechanical guide capable of being spread beyond the body of the communication mobile support, during a contactless communication between the smart card and a contactless card reader.

5. A communication interface according to claim 1, wherein the smart card is a contact and/or contactless card.

6. A communication mobile substrate provided with a smart card, including a communication interface according to claim 1.

7. A communication interface according to claim wherein the smart card is a contact and/or contactless card.

8. A communication interface according to claim 3, wherein the smart card is a contact and/or contactless card.

9. A communication interface according to claim 1, wherein the smart card is a contact and/or contactless card.

10. A communication interface according to claim 4, wherein the smart card is a contact and/or contactless card.

11. A communication mobile substrate provided with a smart card, including a communication interface according to claim 2.

12. A communication mobile substrate provided with a smart card, including a communication interface according to claim 3.

* * * * *